(12) United States Patent
Klemic et al.

(10) Patent No.: US 7,420,187 B1
(45) Date of Patent: Sep. 2, 2008

(54) CITIZEN'S DOSIMETER

(75) Inventors: Gladys Klemic, Naperville, IL (US); Paul Bailey, Chicago, IL (US); Cecilia Breheny, Yonkers, NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 107 days.

(21) Appl. No.: 11/288,058

(22) Filed: Nov. 18, 2005

Related U.S. Application Data

(60) Provisional application No. 60/696,295, filed on Jul. 1, 2005.

(51) Int. Cl.
*H05B 33/00* (2006.01)
(52) U.S. Cl. .................................. 250/484.5
(58) Field of Classification Search ............... 250/484.5
See application file for complete search history.

(56) References Cited

U.S. PATENT DOCUMENTS

| | | | |
|---|---|---|---|
| 3,202,821 A * | 8/1965 | Kocher | 250/482.1 |
| 6,198,108 B1 * | 3/2001 | Schweitzer et al. | 250/472.1 |
| 6,271,528 B1 * | 8/2001 | Struye et al. | 250/484.5 |
| 6,316,782 B1 * | 11/2001 | Akselrod et al. | 250/582 |
| 6,811,607 B2 * | 11/2004 | Akselrod | 117/19 |
| 7,227,158 B1 * | 6/2007 | Patel et al. | 250/484.5 |

* cited by examiner

*Primary Examiner*—David P. Porta
*Assistant Examiner*—Jessica L Eley
(74) *Attorney, Agent, or Firm*—Brian J. Lally; Mark P. Dvorscak; Paul A. Gottlieb

(57) ABSTRACT

The present invention relates to a citizen's dosimeter. More specifically, the invention relates to a small, portable, personal dosimetry device designed to be used in the wake of a event involving a Radiological Dispersal Device (RDD), Improvised Nuclear Device (IND), or other event resulting in the contamination of large area with radioactive material or where on site personal dosimetry is required. The card sized dosimeter generally comprises: a lower card layer, the lower card body having an inner and outer side; a upper card layer, the layer card having an inner and outer side; an optically stimulated luminescent material (OSLM), wherein the OSLM is sandwiched between the inner side of the lower card layer and the inner side of the upper card layer during dosimeter radiation recording, a shutter means for exposing at least one side of the OSLM for dosimeter readout; and an energy compensation filter attached to the outer sides of the lower and upper card layers.

18 Claims, 11 Drawing Sheets

CITIZEN'S DOSIMETER

RELATION TO OTHER PATENT APPLICATIONS

The present application claims priority to U.S. Provisional Patent Application No. 60/696,295 filed on Jul. 1, 2005, by instant inventors, which is hereby incorporated by reference in its entirety.

GOVERNMENT RIGHTS IN THE INVENTION

The United States Government has rights in this invention pursuant to the employer-employee relationship of the Government to the inventors as U.S. Department of Homeland Security Employees.

FIELD OF INVENTION

The present invention relates to a citizen's dosimeter. More specifically, the invention relates to a small, credit-card sized, personal dosimetry device designed to be used in the wake of an event involving a Radiological Dispersal Device (RDD), Improvised Nuclear Device (IND), or other event or situation where on site personal radiation dosimetry is called for. The invention also relates to a readout and recordation system for monitoring radiation exposure using the invented citizen's dosimeter.

BACKGROUND OF THE INVENTION

In the wake of terror attacks on September 11th, the threat of terrorists using a Radiation Dispersal Device (RDD), commonly referred to as a "dirty bomb" or an improvised nuclear device (IND) is a frightening possibility. In fact, several government agencies have concluded that terrorist groups like Al'Qa'ida are actively seeking to acquire radionuclear devices for use against U.S. citizens and interests, both here in the United States and abroad.

If this threat is realized, federal, state and local authorities must be prepared. An important aspect of any emergency management plan following such an event involves the safety and monitoring of: first responders, health-care workers, and citizens that are exposed to radiation resulting from the radiological or nuclear device.

While radiation exposure of first responders and health-care workers may at least partially be monitored using traditional radiation detecting devices, monitoring exposure of potentially tens of thousands of citizens presents a more difficult problem.

After removable contamination has been eliminated, there may be a need for personal external dosimetry monitoring for individual members of the public as well as large numbers of workers. Site restoration could be a lengthy project, and to minimize disruption to society it may be necessary to allow inhabitants to have access to certain areas of the city before cleanup is complete. For example, allowing citizens to pass through transit centers, thoroughfares, or certain areas of buildings could permit government operations, commerce, uniting of families, routine medical treatments, etc. As an individual moves through a contaminated city, the locations visited and time spent at them would vary, and a personal dosimeter would allow tracking of the accumulated dose. Such dose measurements could reduce reliance on models and estimates and avoid unnecessary area denial time. Unlike cleanup at decommissioned facilities where the public could be excluded with little cost to society, in an urban environment, time is of the essence and the cost of exclusion may be greater than the benefit avoiding exposure to a relatively low radiation dose. After cleanup, personal dosimetry could boost public confidence that their external dose is below acceptable maximums and that the final cleanup was effective. A need exists for a personal radiation detection device (i.e. dosimeter) that is small and easily carried, provides field-readable exposure data, is cost effective and is capable of providing dosimetry of record over a wide dose range. A dosimeter in the familiar format of a credit card or identification card that can be readout at stations similar to transit or bank card readers would meet these needs.

The Citizen's Dosimeter fills a technology gap among other currently available dosimeter options. For example, the SIRAD 'casualty dosimeters' are designed to be carried to identify medically significant exposures for triage. Alarming, interdiction electronic radiation monitors are expensive ($100+) and not widely accepted for dose of record in the United States. The approximately 85,000 personal radiation dosimeters stockpiled by states for emergency use and those currently used for monitoring radiation worker dose of record are not readable in the field. In contrast, the Citizen's Dosimeter would be used in the aftermath of an event, sensitive to the entire range of radiation levels spanning public and worker dose limits as well as casualty levels, field readable while providing dose of record, and inexpensive at about $20 a piece. See Klemic, G., Bailey, P., Miller, K., Monetti, M. External radiation dosimetry in the aftermath of radiological terrorist event, Rad. Prot. Dosim, in press;

Several radiation measurement technologies currently exist including TLD dosimeters, OSL dosimeters, electronic dosimeters, and quartz or carbon fiber electrets.

Thermoluminescent Dosimeter (TLD) badges are personal monitoring devices using a special material (i.e. lithium flouride) that retains deposited energy from radiation. TLD badges are read using heat which causes the TLD material to emit light which is then detected by a TLD reader (calibrated to provide a proportional electric current). One disadvantage of TLD badges is that once read, the signal of the device is erased or zeroed out. Furthermore, it takes between approximately 20-30 seconds to obtain the reading. In dosimetry programs which use TLDs for dosimetry of record, the dosimeters are returned to a processing laboratory for readout. Optically Stimulated Luminescence (OSL) badges use an optically stimulated luminescent material (OSLM) (i.e. aluminum oxide) to retain radiation energy. Tiny crystal traps within the OSL material trap and store energy from radiation exposure. The amount of exposure is determined by shining a light of one color (i.e. green) on the crystal traps and measuring the amount of light of another color (i.e. blue) emitted. Alternatively, pulsed light stimulation can be used to differentiate between the stimulation and emission light [there is a patent for this, held by Stephen McKeever, See, U.S. Pat. Nos. 5,892,234 and 5,962,857, issued to McKeever et al. Unlike TLD, OSL systems provide readouts in only a few seconds and provides multiple readouts since only a very small fraction of the exposure signal is depleted when readout. In current dosimetry programs, for dosimetry of record, based on OSL and TLD dosimeters, the dosimeters are returned to a processing laboratory for readout.

One of the problems with state of the art OSL systems is that the filters used within the dosimeters are too thick for use in a thin, credit card sized dosimeter. For more information on OSL materials and systems, see, U.S. Pat. No. 5,731,590 issued to Miller; U.S. Pat. No. 6,846,434 issued to Akselrod; U.S. Pat. No. 6,198,108 issued to Schwietzer et al.; U.S. Pat. No. 6,127,685 issued to Yoder et al.; U.S. patent application Ser. No. 10/768,094 filed by Akselrod et al.; all of which are hereby incorporated by reference in their entireties. See also, *Optically Stimulated Luminescence Dosimetry*, Lars Botter-Jensen et al., Elesevier, 2003; Klemic, G., Bailey, P., Miller, K., Monetti, M. External radiation dosimetry in the aftermath of radiological terrorist event, Rad. Prot. Dosim, in press; Akslerod, M. S., Kortov, V. S., and Gorelova, E. A., *Preparation and properties of $Al_2O_3$:C*. Radiat. Prot Dosim 47, 159-164 (1993); and Akselrod, M. S., Lucas, A. C., Polf, J. C., McKeever, S. W. S. *Optically stimulated luminescence of $Al_2O_3$:C*. Radiation Measurements, 29, (3-4), 391-399 (1998), all of which are incorporated by reference in their entireties.

Electronic dosimeters are battery powered, have a digital readout, and audio or vibrating alarming capabilities. These instruments record cumulative dose and have the added advantage of giving real-time dose rate information to the wearer. For routine occupational radiation settings in the U.S. electronic dosimeters are mostly, but not strictly, used for access control and not for dose of record. A number of cities and states issue electronic dosimeters to HAZMAT teams as part of their emergency response plans. There are presently tens of thousands of electronic dosimeters deployed for homeland security purposes, however, electronic dosimeters are impractical for mass use as personal (citizen's) dosimeter due to their high cost.

Quartz or carbon fiber electrets are cylindrical electroscopes where the dose is read by holding it up to the light and viewing the location of the fiber on a scale through an eyepiece at one end. A manually powered charger is needed to zero the dosimeter. The quartz fiber electret is an important element of many state emergency plans. For example, some plans call for emergency responders to be issued a quartz fiber electret along with a card for recording the reading every 30 minutes, as well as a cumulative dosimetry badge or wallet card. While they are specified for use in nuclear power plant emergencies, the NRC does not require them to be NVLAP accredited, only that they be calibrated periodically.

A need exists for a personal radiation detection device (i.e. dosimeter) that: is small and portable (i.e. card-card size), provides real time exposure data, and is cost effective and is capable of providing dosimetry of record.

SUMMARY OF THE INVENTION

The present invention relates to a personal dosimeter and a related radiation exposure system for measuring and recording radiation exposure. The invented personal dosimeter is a result of the Environmental Measurements Laboratory's (EML) "Citizen's Dosimeter" project for developing a credit card format dosimeter that could be used with strategically placed card-readers. The invented dosimeter takes advantage of the thin format and homogenous sensitivity of powdered, laminated $Al_2O_3$:C which is the basis of a commercially used OSL personal dosimetry system, combined with a novel set of very thin filters to allow the aluminum oxide to be used in a credit card format.

A shutter (or similar) mechanism in the credit card system allows optical readout and reuse of the dosimeter, thereby combining integrating dose of record with an option for user readout. Readers combined with interlocking gates could be designed for access control, and output could be linked to a central database.

The personal dosimeter generally comprises: an optically stimulated luminescent material (OSLM) (i.e. $Al_2O_3$:C), positioned within a credit-card structure, as to be protected by filtering materials when worn by the wearer, but which can be exposed (clear of filters on at least one side) for readout.

During use by the wearer, the OSLM 1 (i.e. aluminum oxide) is sandwiched between at least two layers of filtering material: an electronic equilibrium filter 2 (2') and an energy compensation filter 3 (3'), on both sides of the OSLM 1, as shown in FIG. 1.

The invented dosimeter system would be useful for both worker and citizen use.

BRIEF DESCRIPTION OF THE DRAWINGS

For the purpose of facilitating an understanding of the invention, it is illustrated in the accompanying drawings.

DETAILED DESCRIPTION OF THE INVENTION

The invented personal dosimeter generally comprises: an optically stimulated luminescent material (OSLM) (i.e. $Al_2O_3$:C), positioned within a credit-card structure, as to be protected by filtering materials when worn by the wearer, but which can be exposed (clear of filters on at least one side) for readout.

Figure 1:
FIG. 1—is a schematic illustration of one embodiment of a OSLSM: carbon doped aluminum oxide 1, sandwiched between layers of electronic equilibrium filters (i.e. stainless steel) 2 and 2' and energy compensation filters (i.e. Tantalum) 3 and 3'.
Figure 2:
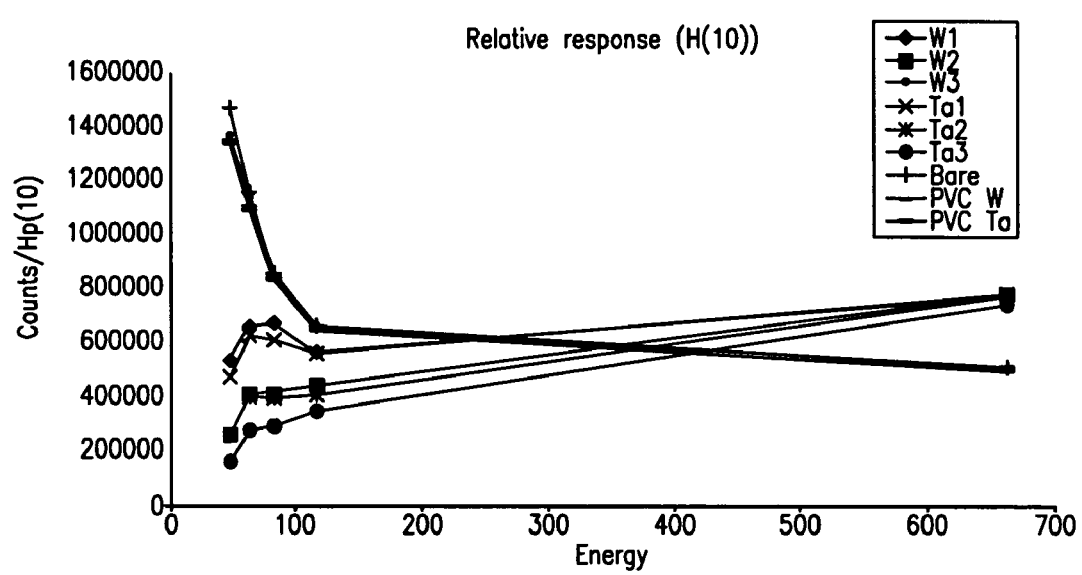
FIG. 2—Graph of energy v. relative response for OSLM combined with various filter materials as well as bare OSLM.
Figure 3:
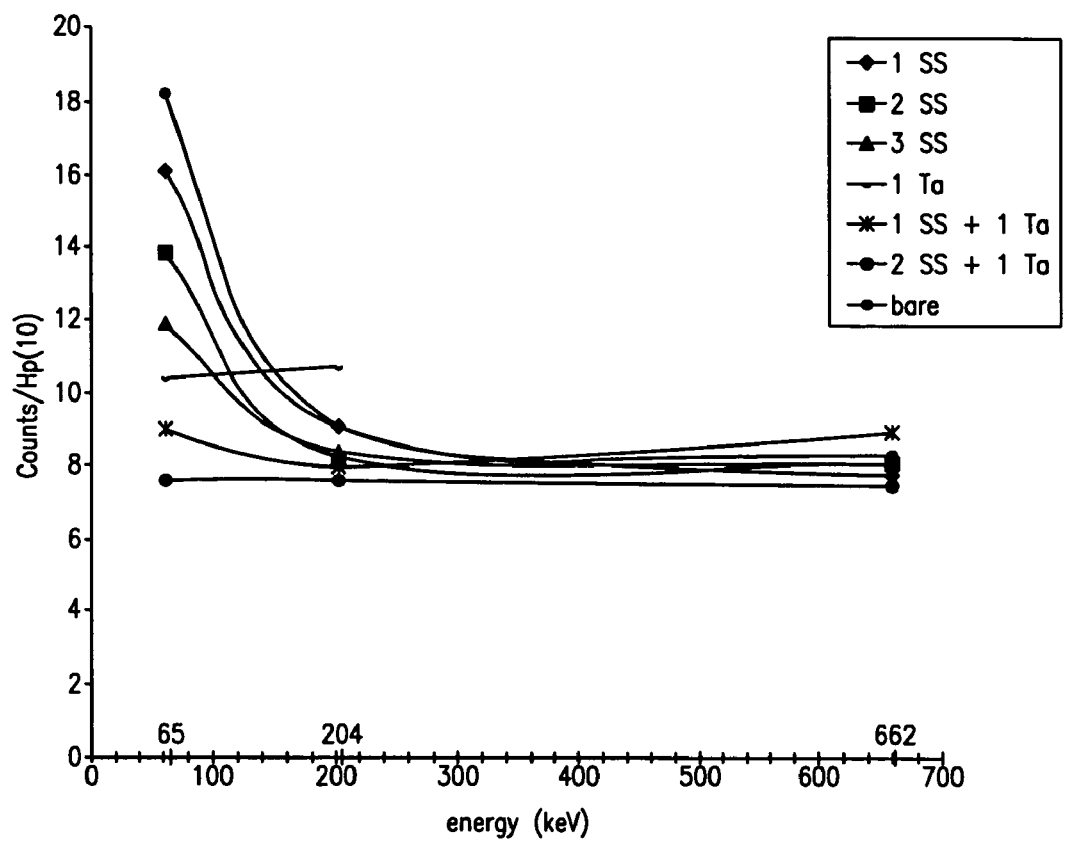
FIG. 3—Graph of energy v. relative response per mrem Hp(10) for OSLM with various filter materials FIG. 4—Graph of energy v. counts/$H_p$(10) at 0 degrees for various combinations of tantalum and stainless steel. Paul, should all the figures should be Hp(10)—I think we only considered deep dose didn't we?

During use by the wearer, the OSLM 1 (i.e. aluminum oxide) is sandwiched between at least two layers of filtering material: an electronic equilibrium filter 2 and an energy compensation filter 3, on both sides of the OSLM 1, as shown in FIG. 1. It should be noted the position/location of the filters is important. The electronic equilibrium filters 2 (2') should be located between the compensation filters 3 (3') and the OSLM 1 as illustrated in FIG. 1. The size of the filters should be at least as large in surface area as the OSLM 1. It may be preferable to use filters having surfaces larger that the OSLM 1, so as to filter angularly incident radiation. One suitable range of sizes is between 1-2 times the size of the OSLM, although larger filters could be employed.

The OSLM 1 is positioned within a card (described below), and between two sheets of filter materials 2 and 3 during times of radiation exposure. Wherein a shutter mechanism (described below) moves the OSLM (or filters) revealing at least one side of the OSL material to allow readout of the doped aluminum oxide by an OSL reader (interfaced with said card reader).

Optical Stimulated Luminescent Material OSLM

The current state of the art Optical Stimulated Luminescent Material (OSLM's) is a specialized carbon-doped aluminum oxide material manufactured by Landauer, Inc. (Glenwood, Ill.), marketed in dosimeters with trade names LUXEL and INLIGHT. The OSLM consists of specially formulated, proprietary, powderized $Al_2O_3$:C deposited on a sheet. This makes it possible to have a large batch with homogeneous sensitivity. Alternatively, one can deposit the aluminum oxide directly upon a surface with a glue binder.

Exposure of the OSLM to ionizing radiation releases electrons which are trapped in defects in the material's crystal structure. The electrons are released from the traps when stimulated with 520 nm wavelength light (i.e. green). As they return to the ground state, 420 nm wavelength light (i.e blue) is emitted. It should be noted that other light wavelengths could be employed, as could a pulsed stimulation system.

The OSLM empties only a fraction of the traps so that the material can be read out repeatedly while still continuing to absorb dose. Bar codes, micro-chips or other storage means can store sensitivity (and other) information on the card so that dosimeters can be read out on cross-calibrated readers.

Current commercial OSL aluminum oxide is available in thin sheets (approx. 0.3 mm), although the thickness of the OLSM can be varied. One suitable thickness range is between about 0.1-1 mm, preferably between about 0.2-0.6 mm. Thinner and thicker forms may be employed in certain situations.

Figure 4:
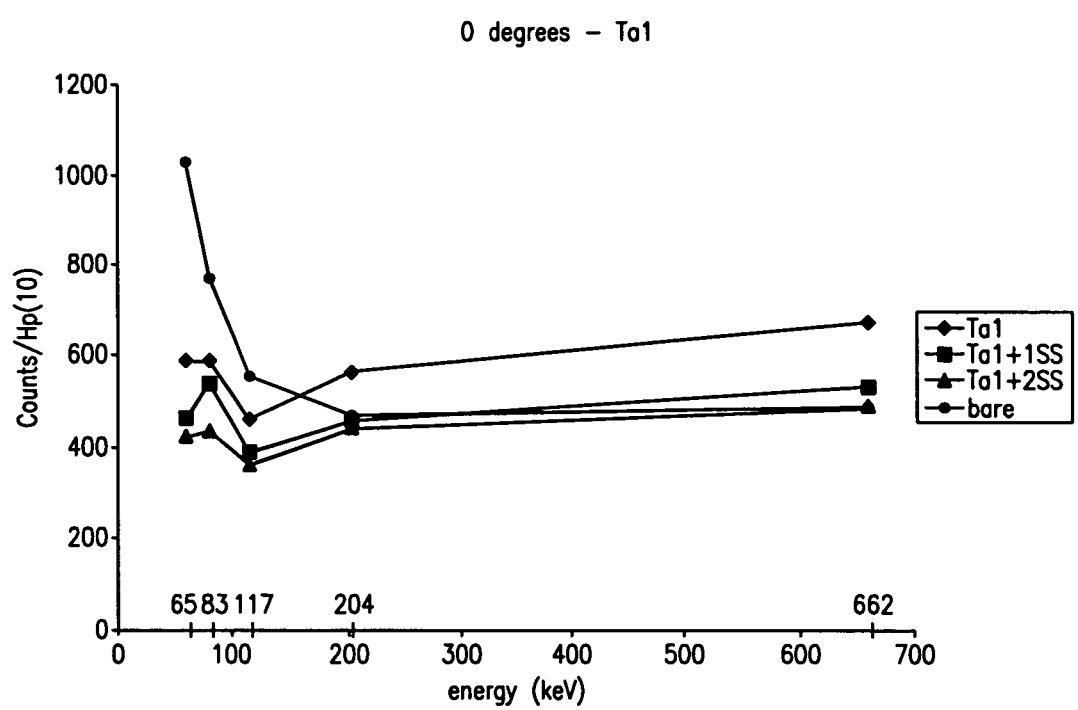
Figure 5:
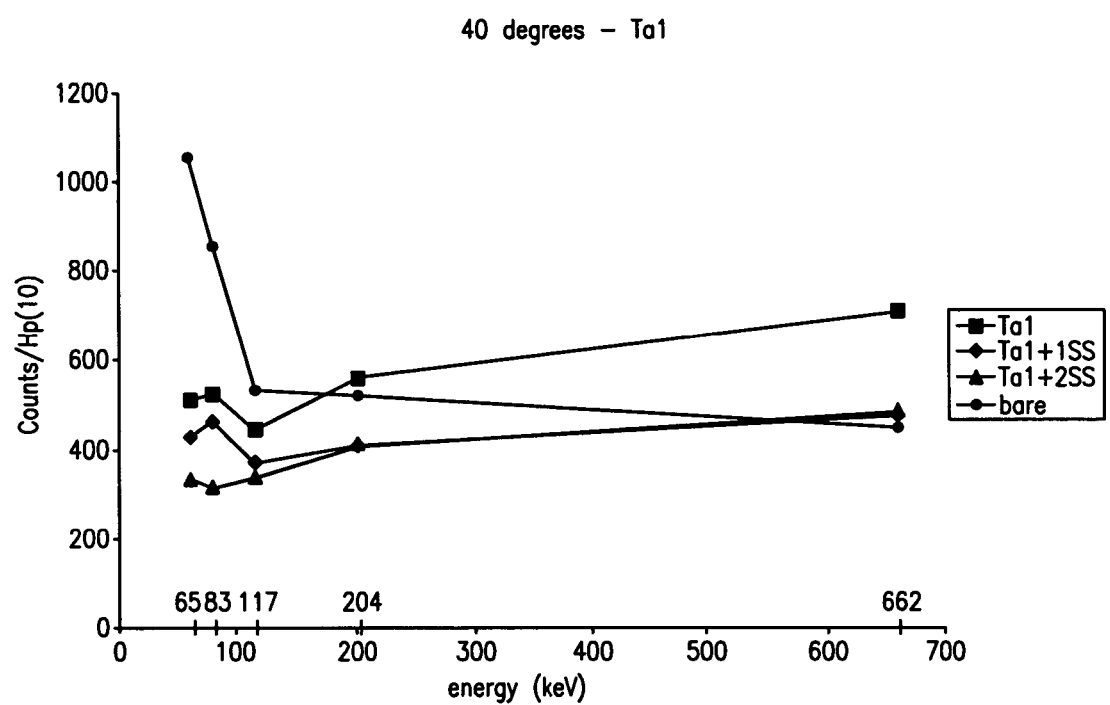
FIG. 5—Graph of energy v. counts/$H_p$(10) at 40 degrees for various tantalum-stainless steel filter combinations.
Figure 6:
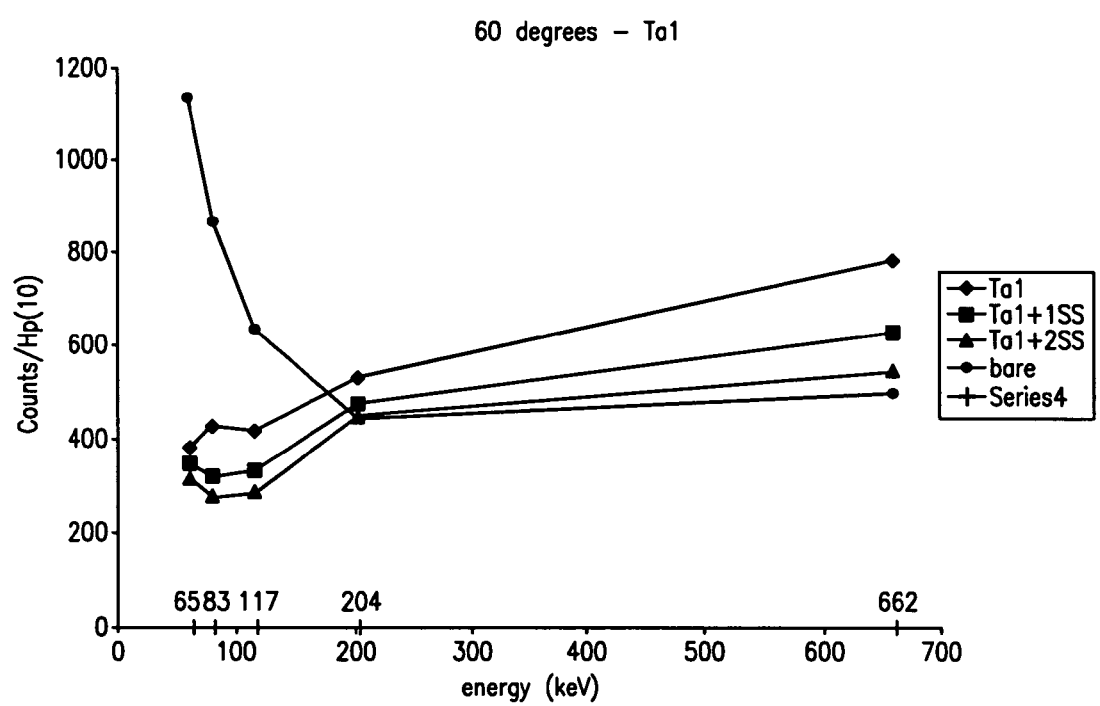
FIG. 6—Graph of energy v. counts/$H_p$(10) at 60 degrees for tantalum-stainless steel filter combinations.
Figure 7:
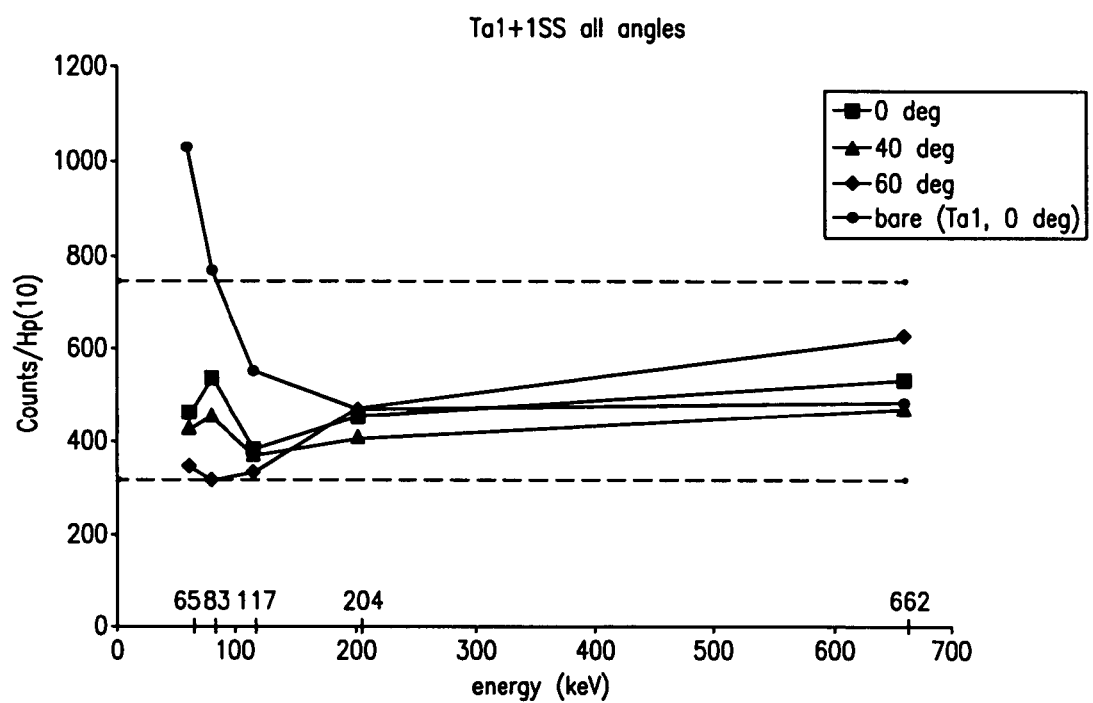
FIG. 7—Graph of energy v. counts/$H_p$(10) at various incident radiation angles for OSLM sandwiched with one layer each of tantalum and stainless steel and compared to bare OSLM at 0 degrees
Figure 8:
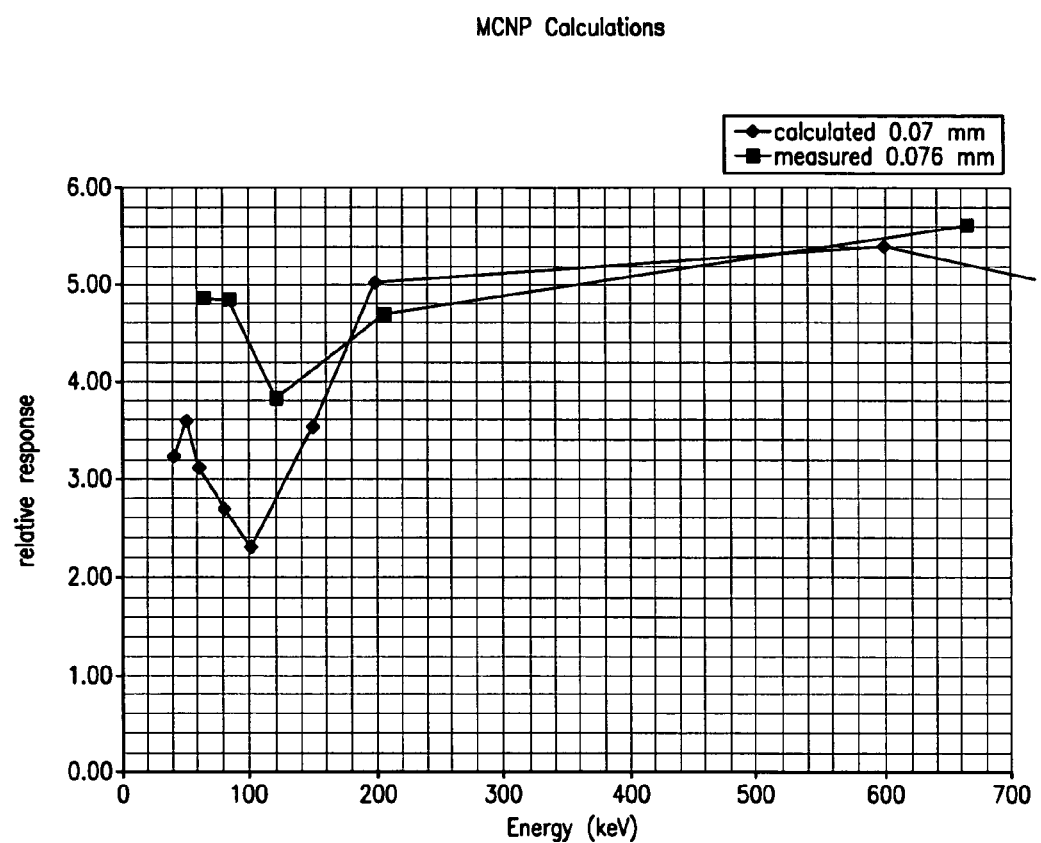
FIG. 8 shows the results of MCNP calculations as expressed in energy v. relative response Paul what material was this? Do you have an alternate figure you'd prefer?

OSL materials require filters for energy compensation and electronic equilibrium as well as light-tight packaging. Energy compensation is needed because carbon doped aluminum oxide material does not have a flat response over the range of gamma energies that are relevant for personal dosimetry. In particular, its personal dose equivalent response to 50 keV photons is about 3 times greater than that to 662 keV, as shown in FIG. 4.

Previous dosimeters have corrected this energy compensation with various filters. However, currently employed filter materials require thickness too large for use in a credit card sized dosimeter.

For example; a Landauer "Luxel" badge uses a sandwich of 1 mm of plastic and 0.7 mm copper; the OSLM is 0.3 mm thick, for a thickness of 3.7 mm, plus additional packaging. A credit card is approximately 0.5-1.5 mm thick.

It should be noted that while doped aluminum oxide is preferred it may be possible to use other OSLM material or other dosimetry materials, although it is clear that OSLMs have several advantages as described herein. See, U.S. Pat. No. 6,846,434 issued to Akselrod, which is hereby incorporated by reference in its entirety.

Novel OSLM Filter(s)

As noted earlier, doped aluminum oxide requires energy compensation filters to produce a flat response over a range of gamma energies. Current dosimeters use copper with thicknesses too great for use in a credit-card sized dosimeter. Therefore, inventors had to discover a novel combination of filter materials capable of being incorporated into a credit-card form and thickness.

Inventors investigated a number of materials to find an energy compensation filter that would allow the use of less (thinner) material, and which was relatively inexpensive. Modeling tests were performed on a variety of materials including but not limited to: gold, lead, tungsten and tantalum and concluded that tantalum (Ta) and Tungsten (W) were the most promising for flattening the low energy response. Tantalum was chosen after modeling (Monte Carlo calculations) experiments showed that W reduced the low energy response more than necessary, so research focused on tantalum. Also, tantalum was less expensive (~$6 per square inch compared to ~$9 per square inch for W).

Solving the low energy compensation problem, however, led to additional problems. For example, high energy photons generate electrons when interacting with heavy metals like tantalum. These electrons generated in the metal (i.e. tantalum) penetrated into the OSLM causing an increase in its response at high photon energy, putting the dosimeter out of electronic equilibrium. Current art technologies use plastic, behind the metal and in front of the aluminum oxide, to compensate for this effect. The plastic absorbs the extra electrons, restoring electronic equilibrium. One of the disadvantages of current energy compensation filters is that they require thickness that are too large for use in a credit-card sized dosimeter.

Various materials were investigated as potential electronic equilibrium filters including PVC, high density polyethylene, and lower density metals such as aluminum, titanium, and stainless steel. Instead of plastic, the inventors discovered that a very thin sheet of stainless steel (SS) can act as the electronic equilibrium filter with excellent results.

Stainless steel was especially desirable because it is a component of an existing credit card format product housing (not a dosimeter but a data storage device) from StorCard, Inc. (San Jose, Calif.) which inventors use in one embodiment of the credit-card sized dosimeter. Stainless steel behind tantalum was found to give the best response. See, FIGS. 2-7. The numbers in the figures are shorthand for use in carrying out and documenting the experiments. The label "1 Ta" meant 0.076 mm tantalum. The label "1 SS" meant ~~0.076 mm stainless steel. The label "2 SS+1 Ta" meant two pieces of 0.076 mm stainless steel with 1 piece of 0.076 mm tantalum.

The discovery of these novel filtering materials allowed inventors to reach their goal of having a total thickness (aluminum oxide sandwiched between metals) to be close to that of a credit-card (i.e. approximately 0.5-1.5 mm), and an energy response sufficient to pass the American National Standards Institute (ANSI) standard for personal dosimetry accreditation (ANSI N13.11) which requires the low energy and 662 keV response to be within 30%. Typical OSLM is approx. 0.3 mm thick.

One embodiment of the invention that meet these requirement comprises: 0.076 mm tantalum+~0.076 mm stainless steel+0.3 mm OSLM+~0.076 mm stainless steel+~0.076 mm tantalum.

Although the above filters are a preferred embodiment, the thickness of the metal filters an OSLM (i.e. aluminum oxide) can be varied. For example, one suitable range of filter thicknesses is between about 0.03-0.15 mm each, preferably between 0.05-0.10 mm each. Thinner and thicker filters may be employed in certain situations.

It should be noted that the OSLM must be moved from behind at least one side of the filters to allow optical readout, so at least one side of the aluminum oxide must be capable of being exposed for read out purposes. Alternatively, at least one side of the filters could be moved to reveal the exposed OSLM.

Citizen Dosimeter Card

The invented dosimeter is designed to be roughly the size and thickness of a credit card. As noted above, the novel thin filters were critical in allowing the creation of a very thin aluminum oxide based dosimeter. Also needed is a suitable card design. The card should allow the aluminum oxide to be covered by the filters during use and wherein the filters can be removed to allow readout and be the thickness of a credit card.

A suitable card design is a modification of a card manufactured by StorCard and has the size, shape, and flexibility of an ordinary credit card, but is made up of laminated layers of plastic and metal. The card contains a rotating data storage disk that is accessed on one side through a window and a shutter. Since the present application does not require the rotating disk, the rotating disk is eliminated, so that the dosimetry material and filters can fit into that cavity. Exemplary StorCard designs are found in U.S. Pat. No. 6,832,730 issued to Conner et al., and U.S. Patent Application Nos. 2003/0218064, 2003/0024995, and 2004/0135241 filed by Conner et al., all which are hereby incorporated by reference in their entireties. The thicknesses, material and other aspects of the various layers, and the sizes and shapes of some of the cut-outs can be modified. It should be noted that a number of other card designs could be employed as long they incorporated the filters as explained herein, protected the OSLM from light when worn by the user, and provided some shutter or similar means to allow easy, multiple readouts of the OSLM material.

In one embodiment, the OSLM is inserted into an existing hole on the movable shutter of the StorCard. When the shutter opens it drags the OSLM over the opening in the card, making it accessible for readout. When the shutter is closed, the OSLM would be dragged into the interior of the card where it would be positioned behind the filters and protected from light. Alternatively, the shutter could be made of filter materials and actuated away to expose fixed OSL material.

Numerous alternative card embodiments and shutter means can be envisioned that allow the aluminum oxide to be covered by the filters during use and wherein the filters can be removed to allow readout.

The dosimeter card can contain an integrated electronic chip that controls the flow of data to and from the card. The chip can be used for updating of information about the card, reader, and dose information. Other storage means could also be used including magnetic strip or other data storage technology. The citizen dosimeter could serve a dual purpose as identity card, the outer layer can be optionally covered with thin plastic layer liked PVC which can be decorated with photo ID, information and/or artwork, and can include a hole for wearing the card on a lanyard, or badge holder. See, U.S. Pat. No. 6,832,730 issued to Conner et al.; U.S. patent application Ser. No. 10/194,132 filed by Conner et al.; U.S. patent application Ser. No. 10/384,385 filed by Conner et al.; and U.S. patent application Ser. No. 10/716,267 filed by Conner et al., all of which are hereby incorporated by reference in their entireties.

Landauer presents their OSL material in a number of different forms. In the "Luxel" dosimeter, it is powdered and laminated in polyester. Alternatively the powdered doped aluminum oxide material can be placed or laminated onto different materials if needed.

Figure 11:
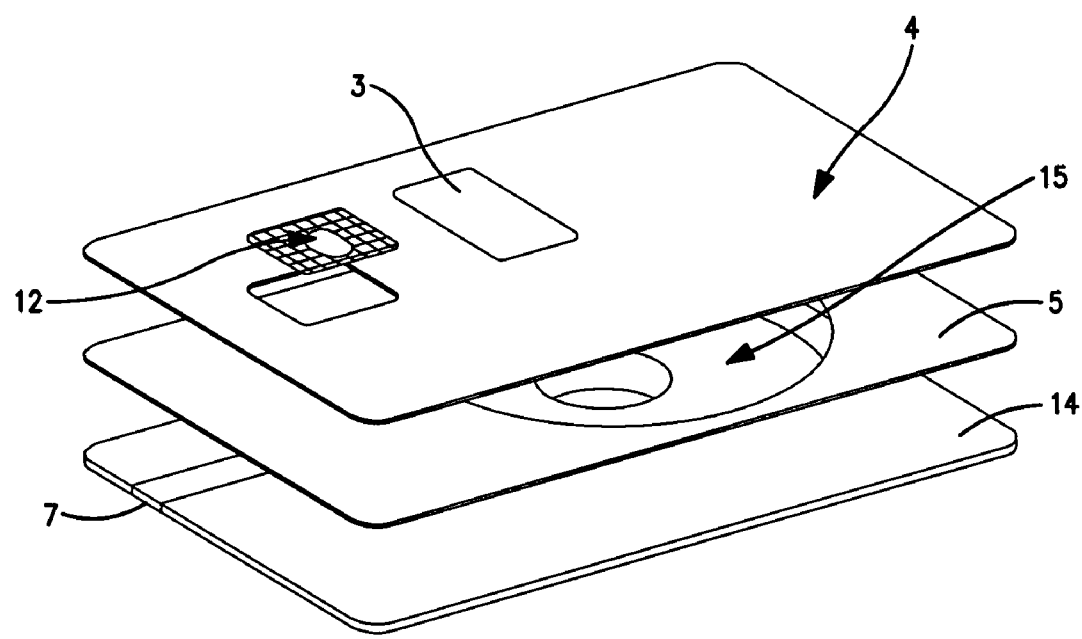
FIG. 11 illustrates an exemplary dosimeter card structure

FIG. 11. illustrates an exemplary dosimeter card generally comprising an lower card layer 14, a spacer 5 and an upper card layer 4, the dosimeter card more fully explained below.

Figure 9:
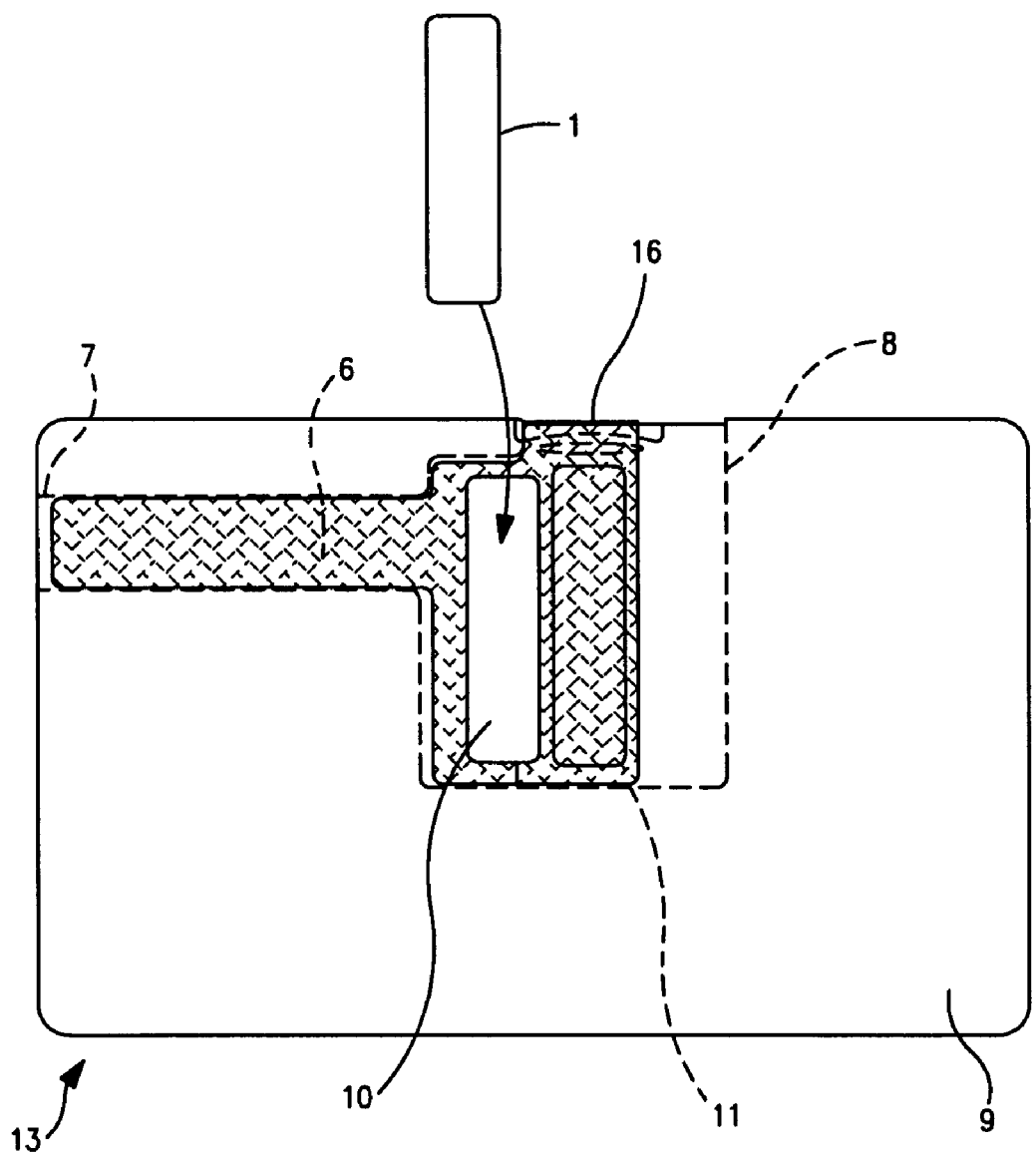
FIG. 9 illustrates the lower card layer of an exemplary card structure
Figure 10:
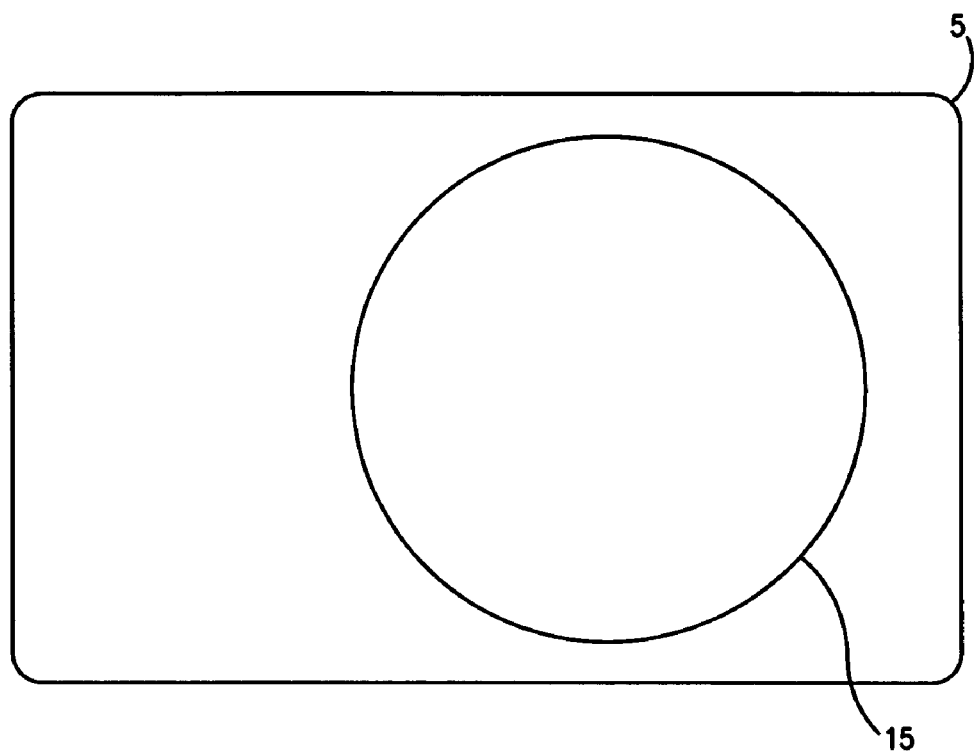
FIG. 10 illustrates the spacer of an exemplary card structure

FIG. 9. shows the inner side of the lower card layer 9 of one embodiment of the card 13 that incorporates a shutter 6 with a long arm that slides inside a cavity 7 and 8 formed in the inner side of the lower card layer 9, thereby partially encapsulating the shutter 6. The lower card layer (LCL) 9 is approximately 0.1524 mm thick stainless steel with a cavity 7, 8, about 0.0762 mm deep, on the inner side of the LCL. The shutter 6 is about 0.0762 mm thick stainless steel and can slide within the cavity 7,8. The shutter 6 contains an opening 10, which in the fully open position, is aligned with a slot (aperture) 11 on the LCL 9, and which is protected behind the upper and lower layers when in the closed position.

The OSLM 1 is positioned within the shutter opening 10. The OSLM can be attached in a variety of ways known in the art including but not limited to the use of adhesives. The slot II allows access to the OSLM 1 for read-out when the shutter opening 10 and slot 11 are aligned. The OSLM 1 is filtered by the upper and lower layers (or by the shutter itself), all of which are made of filtering materials as described herein (i.e. stainless steel), when the shutter 6 is in the closed positioned. The OSLM is also filtered by an energy compensation filter when worn by the user as is explained herein.

The shutter 6 should be in the closed position during typical use. The shutter 6 is then actuated when it is inserted into OSL reader interface (not shown), the interface actuating the shutter mechanism to slide into the open position when inserted and subsequently actuated to slide into the closed position when removing the card from the reader interface. It should be noted that various alternate card embodiments can be employed and may be modified to include an OSLM, a shutter mechanism and various filters if the cards don't already incorporate the required filter materials (i.e. stainless steel, tantalum) into their structure.

Various actuation systems can be employed including pin actuators. See, U.S. Pat. No. 6,832,730 issued to Conner et al.; U.S. patent application Ser. No. 10/194,132 filed by Conner et al.; U.S. patent application Ser. No. 10/384,385 filed by Conner et al.; U.S. patent application Ser. No. 10/716,267 filed by Conner et al., and U.S. patent application Ser. No. 11/021,698 filed by Conner et al, on Dec. 21, 2004; all of which are hereby incorporated by reference in their entireties. The dosimeter card 13 is preferably light tight, or very near light tight because exposure of the OSLM to light can cause partial loss or clearing of stored radiation data.

The shutter 6 optionally has a locking mechanism 16 to keep the shutter 6 closed during normal use and which can be unlocked for readout. The locking means 16 described in the various Conner patents and patent applications can be employed as well as other locking means known in the art.

A spacer 5 is preferably positioned on top of the inner side of the lower card layer 14. See, FIG. 11. The spacer 5 is made of PVC plastic and is approximately 0.381 mm thick. The spacer 5 has an aperture that is aligned with at least part (but preferably not all) of the lower layer's cavity 7,8. The spacer aperture 15 allows the shutter 6 to move easier and allows room so that the OSLM 1 can be slightly thicker that than the shutter 6. The spacer 5 may also help keep the shutter 6 within card recess 7 and 8.

The spacer 5 can be attached to the lower card layer 9 in a number of ways including the use of various adhesives. Alternatively the spacer 5 can be attached using an adhesive layer (s) (not shown). The adhesives and adhesives preferably do not significantly effect the performance of the dosimeter card.

An upper card layer (UCL) 4 is placed on top of the spacer 5. FIG. 11. The UCL 4 can be attached to the spacer 5 in a number of ways including the use of various adhesives or adhesive layers. The upper card layer (UCL) is approximately 0.1524 mm thick stainless steel.

The LCL 9 and UCL 4 layers are preferably constructed of electronic equilibrium filter material and act as the electronic equilibrium filters for the dosimeter card. If the LCL and UCL were not made of a suitable electronic equilibrium filter material, a layer or coating of equilibrium filter material (i.e. stainless steel) could be incorporated into the card to filter the OSLM.

The outer sides of the LCL and UCL are coated/covered with a energy compensation filter layer 3 made from a metal like tantalum as previously explained. The surface area of the filter layer 3 should be equal to or greater than that of the OLSM and should be positioned so that the filters layers 3 (3') are positioned over the OSLM material. The energy compensation filters should have surface area equal to or greater than the surface area of the OSLM. The energy compensation filter layers 3, 3' can be attached to the card layers in a number of ways well known in the art including use of various adhesives.

The dosimeter card can also incorporate smart chips 12 magnetic strips (not shown) or other information storage means. The dosimeter card can also be coated with a PVC plastic or other similar coating so that the card can be personalized or otherwise modified for identification.

OSL Reader/Card Interface

The credit card dosimetry system generally comprising: a dosimeter card, a dosimeter card interface, and an OSL reader (not shown). The dosimeter card is inserted into the card interface which actuates the shutter mechanism within the card and exposes the OSLM. The OSL reader then reads the OSLM as discussed below.

OSL Reader

An exemplary OSL reader system is the InLight System manufactured by Landauer (and Panasonic).

Exposure of $Al_2O_3$:C to ionizing radiation releases electrons which are trapped in defects in the material's crystal structure. The electrons are released from the traps when stimulated with green visible light with a wavelength of approximately 520 nm and emit blue visible light with a wavelength of approximately 420 nm. This stimulated emission also returns some of the trapped electrons to the ground state. Under a specified stimulation regime (fixed stimulation, reading wavelength, fixed stimulation time and pulse shape) the intensity of the emitted light is proportional to the radiation exposure and is linear in the range from 0.01 mGy (1 mrem) to over 1 kGy (100 krem). Existing OSL technology could be modified to read the invented OSLM dosimeter.

A modified reader will require light stimulation and collection on the same side of the card, which is known in the art. The modified reader would optimize the optics for the credit card format and for ruggedness, low cost, and efficiency to allow strategic reader placement. It would also require a new interface to actuate the shutter on the citizen's dosimeter. One embodiment couples the OSL optics with the StorCard product called "StorPod" which actuates the StorCard for data reading. An example of the StorPod is described in U.S. patent application Ser. No. 10/384,385 filed by Conner et al. as well as the other Conner patents and patent applications are incorporated by reference.

System (Card Reader, OSL Reader, Chip/Upc/Radio Reader, Database Etc.)

The invented OSLM (w/novel filters), dosimeter card, card actuator, and OSL reader can be connected to a computer system (i.e. database) that tracks individual, regional and other data. The card reading centers can be connected to the computer system in a number of ways known in the art including but not limited to: direct network, cellular and other connections.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim:

1. A readable credit card sized citizen's dosimeter for measuring radiation dose of record comprising:
   a lower card layer, the lower card layer having an inner and outer side, and a first aperture;
   a upper card layer, the upper layer card having an inner and outer side;
   an optically stimulated luminescent material (OSLM), the OSLM positioned between the inner side of the lower card layer and the inner side of the upper card layer during radiation measurement;
   energy compensation filters attached to the outer sides of the lower and upper card layers, and;
   a shutter means for exposing at least one side of the OSLM to the first aperture of the lower card layer for readout, wherein the shutter means covers the first aperture when the shutter means is in the closed position during radiation measurement, and exposes the OSLM to the first aperture when the shutter means is open during readout, wherein the upper and lower card layers are made of stainless steel, the stainless steel acting as an electronic equilibrium filter, and wherein the energy compensation filters comprise Tantalum.

2. The dosimeter of claim 1, wherein the upper and lower card layers are connected via one or more intervening layers.

3. The dosimeter of claim 2, wherein the layers are connected with adhesives.

4. The dosimeter of claim 2, wherein at least one of the intervening layers is an adhesive layer.

5. The dosimeter of claim 2, wherein the at least one of the intervening layers is a spacer layer.

6. The dosimeter of claim 1, wherein the inner side of the lower card layer has a recess and wherein the shutter means is a card shutter that movably slides within the lower card layer recess.

7. The dosimeter of claim 1, wherein the OSLM is attached to part of the card shutter means.

8. The dosimeter of claim 1, wherein the energy compensation filters are positioned over the OSLM material during radiation measurement.

9. The dosimeter of claim 1, wherein the energy compensation filters are between about 0.05-0.15 mm thick the equilibrium filters are between about 0.05 and 0.15 mm thick and the dosimeter card is between about 0.5 and 2.0 mm thick.

10. The dosimeter of claim 1, wherein the OSLM is sandwiched between two layers of filtering materials on both sides of the OSLM during radiation measurement.

11. The dosimeter of claim 1, wherein the energy compensation filters are between about 0.05-0.15 mm thick.

12. The dosimeter of claim 1, wherein the equilibrium filters are between about 0.05 and 0.15 mm thick.

13. The dosimeter of claim 1, wherein the OSLM is carbon doped aluminum oxide.

14. The dosimeter of claim 1, further comprising a locking means for locking the shutter means, the locking means keeping the shutter means covering the first aperture during radiation measurement, the locking means capable of being unlocked for readout.

15. The dosimeter of claim 1, wherein the dosimeter card is between about 0.5 and 2.0 mm thick.

16. A credit card sized citizen's dosimeter for measuring radiation dose comprising:
   a lower card layer, the lower card layer having an inner and outer side, and a first aperture;
   a upper card layer, the upper layer card having an inner and outer side;
   an optically stimulated luminescent material (OSLM), the OSLM positioned between the inner side of the lower card layer and the inner side of the upper card layer during radiation measurement;
   an energy compensation filter attached to the outer sides of the lower and upper card layers, and;
   a shutter means for exposing at least one side of the OSLM to the first aperture of the lower card layer for readout, wherein the shutter means covers the first aperture when the shutter means is in the closed position during radiation measurement, and exposes the OSLM to the first aperture when the shutter means is open during readout, and wherein the upper and lower card layers are made of stainless steel, the stainless steel acting as an electronic equilibrium filter, and wherein the energy compensation filters comprise Tantalum.

17. The dosimeter of claim 16, wherein the upper and lower card layers connected via one or more intervening layers.

18. The dosimeter of claim 16, wherein the dosimeter is between about 0.5-2.0 mm thick.

* * * * *